(12) United States Patent
Li

(10) Patent No.: US 9,882,489 B2
(45) Date of Patent: Jan. 30, 2018

(54) BUCK-BOOST CONVERTERS WITH RAMP COMPENSATION

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/603,353

(22) Filed: May 23, 2017

(65) Prior Publication Data

US 2017/0346400 A1   Nov. 30, 2017

(30) Foreign Application Priority Data

May 26, 2016 (CN) .......................... 2016 1 0357510

(51) Int. Cl.
*H02M 3/158* (2006.01)
*H02M 1/08* (2006.01)
*H02M 1/12* (2006.01)
*H02M 1/00* (2006.01)

(52) U.S. Cl.
CPC ........... *H02M 3/1582* (2013.01); *H02M 1/08* (2013.01); *H02M 1/12* (2013.01); *H02M 2001/0009* (2013.01)

(58) Field of Classification Search
CPC ........ H02M 3/1582; H02M 1/08; H02M 1/12; H02M 2001/0009
See application file for complete search history.

(56) References Cited

U.S. PATENT DOCUMENTS

| 2010/0231189 A1* | 9/2010 | Chen | H02M 3/1582 323/284 |
| 2010/0231272 A1* | 9/2010 | Chen | H02M 3/1582 327/140 |
| 2011/0279098 A1* | 11/2011 | Ren | H02M 3/1582 323/234 |
| 2014/0084883 A1* | 3/2014 | Tanabe | H02M 3/1582 323/271 |
| 2014/0266085 A1* | 9/2014 | Unno | H02M 3/04 323/234 |
| 2014/0285170 A1 | 9/2014 | Deng | |
| 2014/0354250 A1 | 12/2014 | Deng | |

(Continued)

*Primary Examiner* — Jue Zhang
(74) *Attorney, Agent, or Firm* — Perkins Coie LLP

(57) ABSTRACT

A control method used in a four-switch buck-boost converter includes: filtering the voltage at the first switching node and generating a first ramp signal; filtering the first ramp signal and generating a first average signal; filtering the voltage at the second switching node and generating a second ramp signal; filtering the second ramp signal and generating a second average signal; generating a set signal based on the first ramp signal, the first average signal, the second ramp signal, the second average signal, a reference signal, and a feedback signal indicative of the output voltage, so as to turn on the first and third transistors, and turn off the second and fourth transistors; turning off the first transistor and turning on the second transistor when the on-time of the first transistor reaches a first time threshold; and turning off the third transistor and turning on the fourth transistor when the on-time of the third transistor reaches a second time threshold.

15 Claims, 10 Drawing Sheets

(56) References Cited

U.S. PATENT DOCUMENTS

| | | | | |
|---|---|---|---|---|
| 2015/0171730 A1* | 6/2015 | Yin | ............... | H02M 3/157 |
| | | | | 323/272 |
| 2015/0280559 A1* | 10/2015 | Vaidya | ............... | H02M 3/1582 |
| | | | | 323/271 |
| 2015/0357914 A1* | 12/2015 | Ozanoglu | ............... | H02M 3/1582 |
| | | | | 323/271 |
| 2015/0365000 A1* | 12/2015 | Dhuyvetter | ............... | H02M 3/1582 |
| | | | | 323/271 |
| 2016/0190931 A1 | 6/2016 | Zhang | | |
| 2016/0315535 A1 | 10/2016 | Ouyang | | |

\* cited by examiner

BUCK-BOOST CONVERTERS WITH RAMP COMPENSATION

CROSS-REFERENCE TO RELATED APPLICATIONS

This application claims the benefit of CN application 201610357510.3, filed on May 26, 2016, and incorporated herein by reference.

TECHNICAL FIELD

The present invention generally relates to electronic circuits, and more particularly but not exclusively, to buck-boost converters with four transistors.

BACKGROUND

Portable electronic devices are becoming smaller and smaller, which accordingly causes the volume and capacity of their batteries to decrease. In order to improve endurance of the batteries, power supply modules of these electronic devices are required to provide a stable output voltage when the battery voltage varies in a wide range. Buck-boost converters thus are widely used in these applications.

FIG. 1 illustrates a traditional buck-boost converter with four transistors. Energy is stored in the inductor L when the transistors S1, S3 are on and the transistors S2, S4 are off. The stored energy is then provided to a load when the transistors S1, S3 are off and the transistors S2, S4 are on. Since the transistors S1-S4 keep switching during operation, power loss of this traditional buck-boost converter is large.

In order to reduce the power loss, different working modes, such as BUCK mode, BOOST mode and BUCK-BOOST mode are adopted. Nevertheless, how to make sure the converter work smoothly during various modes becomes a challenge.

SUMMARY

Embodiments of the present invention are directed to a control method of a buck-boost converter, wherein the buck-boost converter having a first transistor coupled between an input voltage and a first switching node, a second transistor coupled between the first switching node and a reference ground, a third transistor coupled between a second switching node and the reference ground, a fourth transistor coupled between the second switching node and an output voltage, and an inductor coupled between the first switching node and the second switching node. The control method comprises: filtering the voltage at the first switching node and generating a first ramp signal; filtering the first ramp signal and generating a first average signal; filtering the voltage at the second switching node and generating a second ramp signal; filtering the second ramp signal and generating a second average signal; generating a set signal based on the first ramp signal, the first average signal, the second ramp signal, the second average signal, a reference signal, and a feedback signal indicative of the output voltage, so as to turn on the first and third transistors, and turn off the second and fourth transistors; determining whether the on-time of the first transistor reaches a first time threshold, and turning off the first transistor and turning on the second transistor when the first time threshold is reached; and determining whether the on-time of the third transistor reaches a second time threshold, and turning off the third transistor and turning on the fourth transistor when the second time threshold is reached.

Embodiments of the present invention are also directed to a controller used in a buck-boost converter. The controller comprises: a first filtering circuit configured to filter the voltage at the first switching node and generate a first ramp signal; a second filtering circuit configured to filter the first ramp signal and generate a first average signal; a third filtering circuit configured to filter the voltage at the second switching node and generate a second ramp signal; a fourth filtering circuit configured to filter the second ramp signal and generate a second average signal; a comparing circuit coupled to the first to fourth filtering circuits and configured to generate a set signal based on the first ramp signal, the first average signal, the second ramp signal, the second average signal, a reference signal, and a feedback signal indicative of the output voltage; a first on-time control circuit coupled to the comparing circuit, wherein based on the set signal, the first on-time control circuit compares the on-time of the first transistor with a first time threshold and generates a first on-time control signal; a second on-time control circuit coupled to the comparing circuit, wherein based on the set signal, the second on-time control circuit compares the on-time of the third transistor with a second time threshold and generates a second on-time control signal; a first logic circuit coupled to the comparing circuit and the first on-time control circuit, wherein based on the set signal and the first on-time control signal, the first logic circuit generates a first control signal to control the first and second transistors; and a second logic circuit coupled to the comparing circuit and the second on-time control circuit, wherein based on the set signal and the second on-time control signal, the second logic circuit generates a second control signal to control the third and fourth transistors.

Embodiments of the present invention are further directed to a buck-boost converter comprising: a first transistor having a first terminal, a second terminal and a control terminal, wherein the first terminal is configured to receive an input voltage; a second transistor having a first terminal, a second terminal and a control terminal, wherein the first terminal is coupled to the second terminal of the first transistor to form a first switching node, the second terminal is coupled to a reference ground; a third transistor having a first terminal, a second terminal and a control terminal, wherein the second terminal is coupled to the reference ground; a fourth transistor having a first terminal, a second terminal and a control terminal, wherein the first terminal is coupled to the first terminal of the third transistor to form a second switching node, the second terminal is configured to provide an output voltage; an inductor coupled between the first switching node and the second switching node; a feedback circuit configured to generate a feedback signal indicative of the output voltage; a first filtering circuit configured to filter the voltage at the first switching node and generate a first ramp signal; a second filtering circuit configured to filter the first ramp signal and generate a first average signal; a third filtering circuit configured to filter the voltage at the second switching node and generate a second ramp signal; a fourth filtering circuit configured to filter the second ramp signal and generate a second average signal; a comparing circuit coupled to the first to fourth filtering circuits and configured to generate a set signal based on the first ramp signal, the first average signal, the second ramp signal, the second average signal, a reference signal, and the feedback signal; a first on-time control circuit coupled to the comparing circuit, wherein based on the set signal, the first on-time control circuit compares the on-time of the first transistor with a first time threshold and generates a first on-time control signal; a second on-time control circuit coupled to the comparing circuit, wherein based on the set signal, the second on-time control circuit compares the on-time of the third transistor with a second time threshold and generates a second on-time control signal; a first logic circuit coupled to the comparing circuit and the first on-time control circuit, wherein based on the set signal and the first on-time control signal, the first logic circuit generates a first control signal to control the first and second transistors; and a second logic circuit coupled to the comparing circuit and the second on-time control circuit, wherein based on the set signal and the second on-time control signal, the second logic circuit generates a second control signal to control the third and fourth transistors.

In the embodiments of the present invention, ramp compensation is incorporated based on the voltage at the first and second switching nodes, so as to ensure the converter can work stably during various working modes. And because of this, the robustness of the converter is enhanced.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
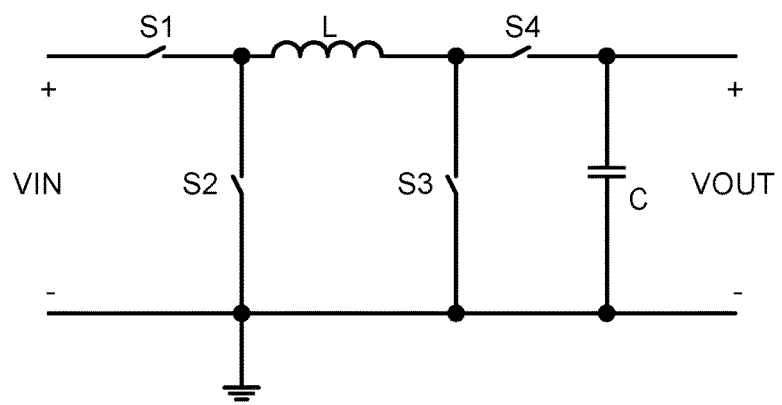
FIG. 1 illustrates a traditional buck-boost converter with four transistors.
Figure 2:
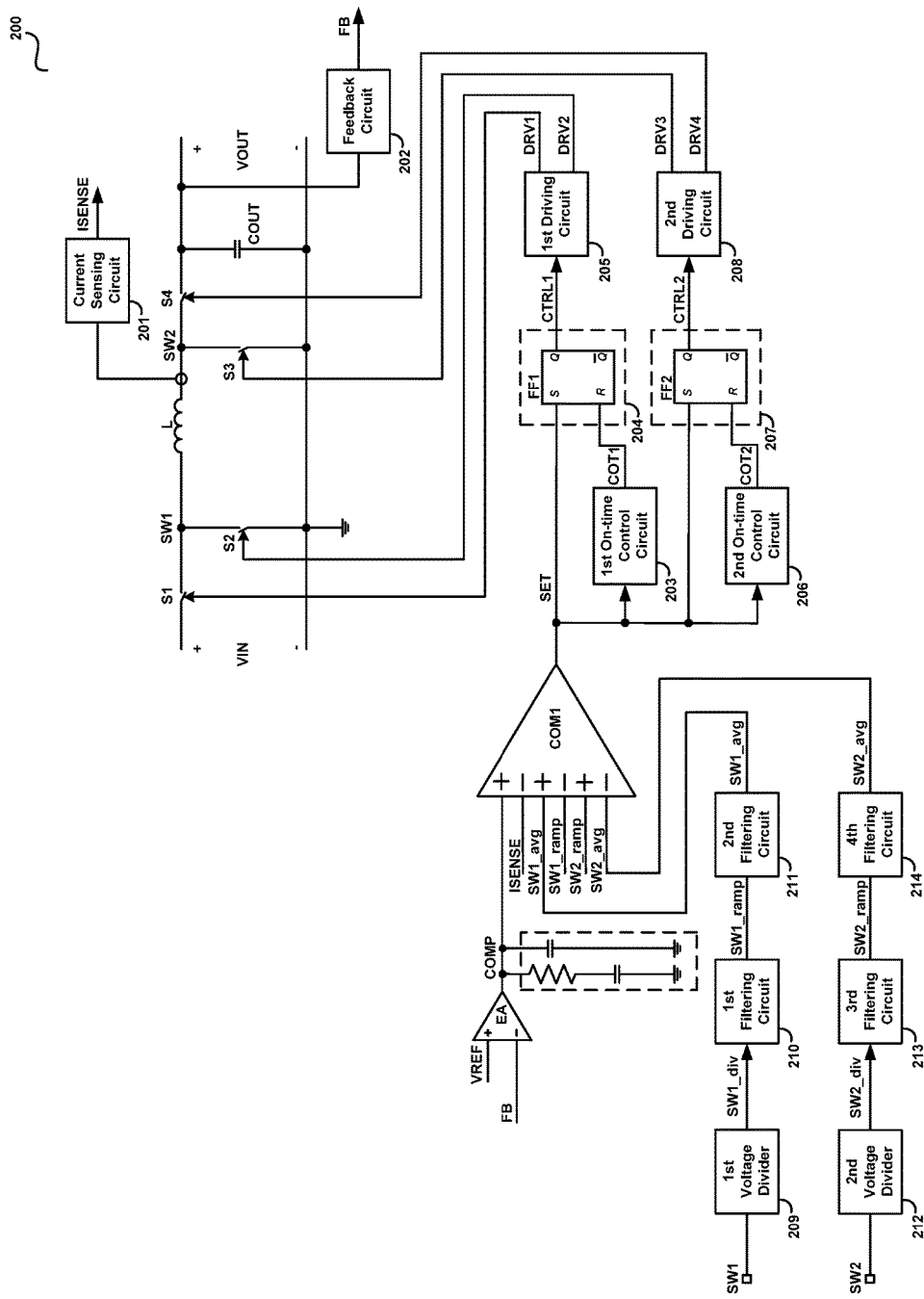
FIG. 2 is a block diagram of a buck-boost converter 200 in accordance with an embodiment of the present invention.

FIG. 2 is a block diagram of a buck-boost converter 200 in accordance with an embodiment of the present invention. The buck-boost converter 200 comprises transistors S1~S4, an inductor L, an output capacitor COUT, an error amplifier EA, a comparator COM1, a current sensing circuit 201, a feedback circuit 202, a first on-time control circuit 203, a first logic circuit 204, a first driving circuit 205, a second on-time control circuit 206, a second logic circuit 207, a second driving circuit 208, a first voltage divider 209, a first filtering circuit 210, a second filtering circuit 211, a second voltage divider 212, a third filtering circuit 213 and a fourth filtering circuit 214. The transistor S1 has a first terminal, a second terminal and a control terminal, wherein the first terminal is configured to receive an input voltage VIN. The transistor S2 has a first terminal, a second terminal and a control terminal, wherein the first terminal is coupled to the second terminal of the transistor S1 to form a first switching node SW1, the second terminal is coupled to a reference ground. The transistor S3 has a first terminal, a second terminal and a control terminal, wherein the second terminal is grounded. The transistor S4 has a first terminal, a second terminal and a control terminal, wherein the first terminal is coupled to the first terminal of the transistor S3 to form a second switching node SW2, the second terminal is configured to provide an output voltage VOUT. The inductor L is coupled between the switching nodes SW1 and SW2. The output capacitor COUT is coupled between the second terminal of the transistor S4 and the reference ground. The transistors S1~S4 might be any controllable semiconductor devices, such as MOSFETs, IGBTs and so on.

The current sensing circuit 201 senses the current flowing through the inductor L and generates a current sensing signal ISENSE. This current sensing circuit 201 can be realized by any of sensing resistors, current transformers, current mirrors, etc. The feedback circuit 202 is coupled to the second terminal of the transistor S4. It senses the output voltage VOUT and generates a feedback signal FB.

The error amplifier EA has a non-inverting input terminal, an inverting input terminal and an output terminal, wherein the non-inverting input terminal is configured to receive a reference signal VREF, the inverting input terminal is coupled to the feedback circuit 202, and wherein based on the reference signal VREF and the feedback signal FB, the error amplifier EA generates a compensation signal COMP at the output terminal. Typically, as shown in FIG. 2, a compensation network consisting of resistors and capacitors is provided between the output terminal of the error amplifier EA and the reference group. Although the error amplifier EA is adopted in the embodiment of FIG. 2, people of ordinary skills in the art could understand that other analog or digital circuits with error amplifying function are also applicable here.

The first voltage divider 209 is coupled to the first switching node SW1, wherein the first voltage divider 209 divides the voltage at the first switching node SW1 and generates a first dividing signal SW1_div. The first filtering circuit 210 is coupled to the first voltage divider 209. It filters the first dividing signal SW1_div and generates a first ramp signal SW1_ramp. The second filtering circuit 211 is coupled to the first filtering circuit 210 and is configured to filter the first ramp signal SW1_ramp and generate a first average signal SW1_avg.

Similarly, the second voltage divider 212 is coupled to the second switching node SW2, wherein the second voltage divider 212 divides the voltage at the second switching node SW2 and generates a second dividing signal SW2_div. The third filtering circuit 213 is coupled to the second voltage divider 212 and is configured to filter the second voltage dividing signal SW2_div and generate a second ramp signal SW2_ramp. The fourth filtering circuit 214 is coupled to the third filtering circuit 213 and is configured to further filter the second ramp signal SW2_ramp and generate a second average signal SW2_avg.

Figure 3A:
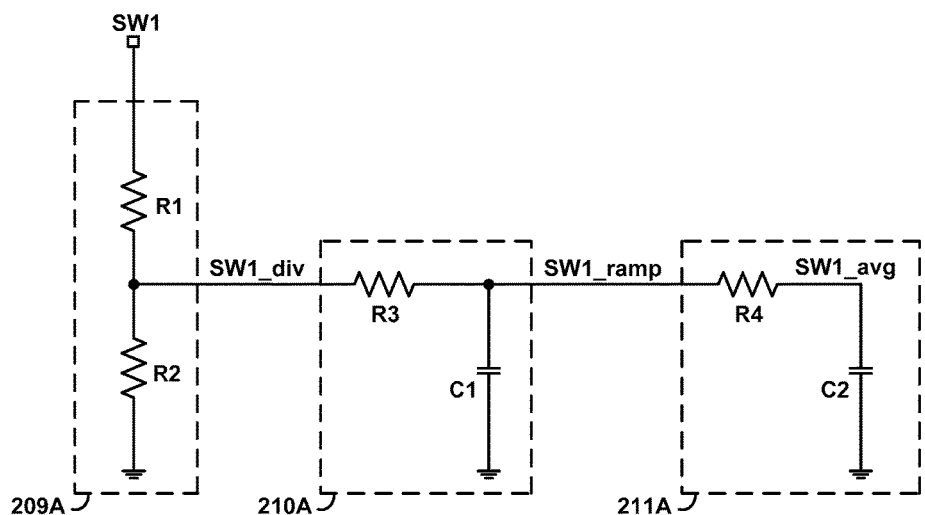
FIGS. 3A and 3B schematically illustrate a ramp compensation generator in accordance with an embodiment of the present invention.
Figure 3B:
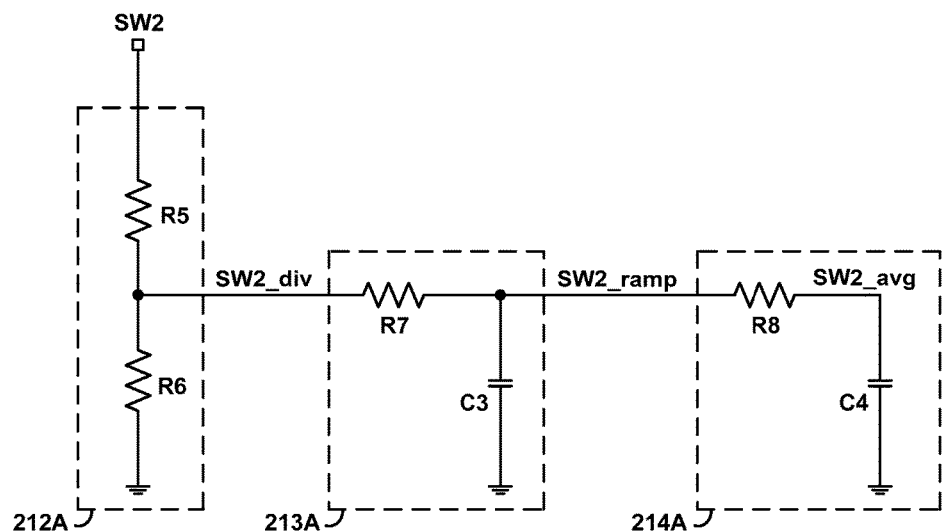

As can be found in embodiments of FIG. 3A and FIG. 3B, the voltage dividers 209 and 212 can be realized by resistor dividers, while the filtering circuits 210, 211, 213 and 214 can be realized by RC filters with resistance and capacitance therein adjusted in accordance with practical applications. Furthermore, in some embodiments, the voltage dividers 209 and 212 are not necessary and may be omitted.

The comparator COM1 has a first input terminal, a second input terminal, a third input terminal, a fourth input terminal, a fifth input terminal, a sixth input terminal and an output terminal, wherein the first input terminal is coupled to the output terminal of the error amplifier EA to receive the compensation signal COMP, the second input terminal is coupled to the output terminal of the current sensing circuit 201 to receive the current sensing signal ISENSE, the third input terminal is coupled to the second filtering circuit 211 to receive the first average signal SW1_avg, the fourth input terminal is coupled to the first filtering circuit 201 to receive the first ramp signal SW1_ramp, the fifth input terminal is coupled to the third filtering circuit 213 to receive the second ramp signal SW2_ramp, the six input terminal is coupled to the fourth filtering circuit 214 to receive the second average signal SW2_avg. The comparator COM1 compares a sum of the current sensing signal ISENSE, the first ramp signal SW1_ramp and the second average signal SW2_avg (ISENSE+SW1_ramp+SW2_avg) with a sum of the compensation signal COMP, the first average signal SW1_avg and the second ramp signal SW2_ramp (COMP+SW1_avg+SW2_ramp), and generates a set signal SET at the output terminal. To simplify the description below, the comparator COM1 could be deemed as comparing a sum of the current sensing signal ISENSE and an equivalent ramp signal RAMP with the compensation signal COMP, wherein the equivalent ramp signal RAMP can be expressed as:

$$RAMP = SW1\_ramp - SW1\_avg + SW2\_avg - SW2\_ramp \quad (1)$$

Obviously, this comparator COM1 could be replaced by other suitable analog or digital circuits which are capable of comparing.

The first on-time control circuit 203 has an input terminal and an output terminal, wherein the input terminal is coupled to the output terminal of the comparator COM1. Based on the set signal SET, the first on-time control circuit 203 compares the on-time of the transistor S11 in one switching period with a first time threshold Ton1 and generates a first on-time control signal COT1 at the output terminal. In an embodiment, the first time threshold Ton1 is proportional to the output voltage VOUT and inversely proportional to the input voltage VIN, and could be expressed as:

$$Ton1 = Tperiod * \frac{VOUT}{VIN} \quad (2)$$

wherein Tperiod represents an expected switching period value.

The second on-time control circuit 206 has an input terminal and an output terminal, wherein the input terminal is coupled to the output terminal of the comparator COM1. Based on the set signal SET, the second on-time control circuit 206 compares the on-time of the transistor S3 in one switching period with a second time threshold Ton2 and generates a second on-time control signal COT2 at the output terminal. In an embodiment, the second time threshold Ton2 is proportional to the difference between the output voltage VOUT and the input voltage VIN, and is inversely proportional to the output voltage VOUT, and could be expressed as:

$$Ton2 = Tperiod * \frac{VOUT - VIN}{VOUT} \quad (3)$$

The first logic circuit 204 has a first input terminal, a second input terminal and an output terminal, wherein the first input terminal is coupled to the output terminal of the comparator COM1, the second input terminal is coupled to the output terminal of the first on-time control circuit 203. Based on the set signal SET and the first on-time control signal COT1, the first logic circuit 204 generates a first control signal CTRL1 at the output terminal. In one embodiment, the first logic circuit 204 includes a RS flip-flop FF1 as shown in FIG. 2.

The second logic circuit 207 has a first input terminal, a second input terminal and an output terminal, wherein the first input terminal is coupled to the output terminal of the comparator COM1, the second input terminal is coupled to the output terminal of the second on-time control circuit 206. Based on the set signal SET and the second on-time control signal COT2, the second logic circuit 207 generates a second control signal CTRL2 at the output terminal. In one embodiment, the second logic circuit 207 includes a RS flip-flop FF2 as shown in FIG. 2.

The first driving circuit 205 is coupled to the output terminal of the first logic circuit 204, wherein based on the first control signal CTRL1, the first driving circuit 205 generates driving signals DRV1 and DRV2 to respectively control the transistors S1 and S2. The driving signals DRV1 and DRV2 are generally complementary with each other. To prevent shoot through, the first driving circuit 205 typically comprises a dead time control circuit to induce dead time between the driving signals DRV1 and DRV2.

The second driving circuit 208 is coupled to the output terminal of the second logic circuit 207, wherein based on the second control signal CTRL2, the second driving circuit 208 generates driving signals DRV3 and DRV4 to respectively control the transistors S3 and S4. The driving signals DRV3 and DRV4 are generally complementary with each other. To prevent shoot through, the second driving circuit 208 typically comprise a dead time control circuit to induce dead time between the driving signals DRV3 and DRV4.

It can be concluded from FIG. 2 that, when the sum of the current sensing signal ISENSE and the equivalent ramp signal RAMP decreases to be lower than the compensation signal COMP, the flip-flops FF1 and FF2 are both set. The transistors S1 and S3 are turned on, the transistors S2 and S4 are turned off. Once the on-time of the transistor S1 reaches the first time threshold Ton1, the flip-flop FF1 is reset to turn off the transistor S1 and turn on the transistor S2. Similarly, the flip-flop FF2 will be reset to turn off the transistor S3 and turn on the transistor S4 if the on-time of the transistor S3 reaches the second time threshold Ton2. These steps are repeated to make the regulation of the output voltage VOUT come true.

When the output voltage VOUT is lower than the input voltage VIN, the second time threshold Ton2 is smaller than zero in accordance with equation (3). Determined by the second on-time control circuit 206, the on-time of the transistor S3 is equal to zero. To be more specific, the flip-flop FF2 might not be set since it is reset dominant. In this situation, the buck-boost converter 200 is working in the BUCK mode. The transistor S3 maintains off and the transistor S4 maintains on, while states of the transistors S1 and S2 are adjusted by the first on-time control circuit 203.

When the output voltage VOUT is higher than the input voltage VIN, the first time threshold Ton1 is longer than Tperiod in accordance with equation (2). As can be seen from FIG. 2, the real switching period Ts of the converter is related to the feedback signal FB and determined by the set signal SET. Therefore, determined by the first on-time control circuit 203, the on-time of the transistor S1 will become equal to the switching period Ts if the first time threshold Ton1 is longer than the real switching period Ts. This means, the transistor S1 would not be turned off since the on-time of the transistor S1 cannot hit the first on-time threshold Ton1 to reset the flip-flop FF1 before the current sensing signal ISENSE reduces to set the flip-flop FF1 again. In this situation, the buck-boost converter 200 is working in the BOOST mode. The transistor S1 maintains on and the transistor S2 maintains off, while states of the transistors S3 and S4 are adjusted by the second on-time control circuit 206.

When the output voltage VOUT is larger than the input voltage VIN and the first time threshold Ton1 is smaller than the switching period Ts, the buck-boost converter 200 works in a BUCK-BOOST mode. The transistors S1 and S3 are both turned on while the sum of the current sensing signal ISENSE and the equivalent ramp signal RAMP decreases to be lower than the compensation signal COMP. According to equations (2) and (3), we can get: Ton1>Tperiod>Ton2. Therefore, the on-time of the transistor S3 is going to hit the second time threshold Ton2 first, to turn off the transistor S3 and turn on the transistor S4. Afterwards, the transistor S1 is turned off and the transistors S2 is turned on when the on-time of the transistor S1 hits the first time threshold Ton1.

Figure 4:
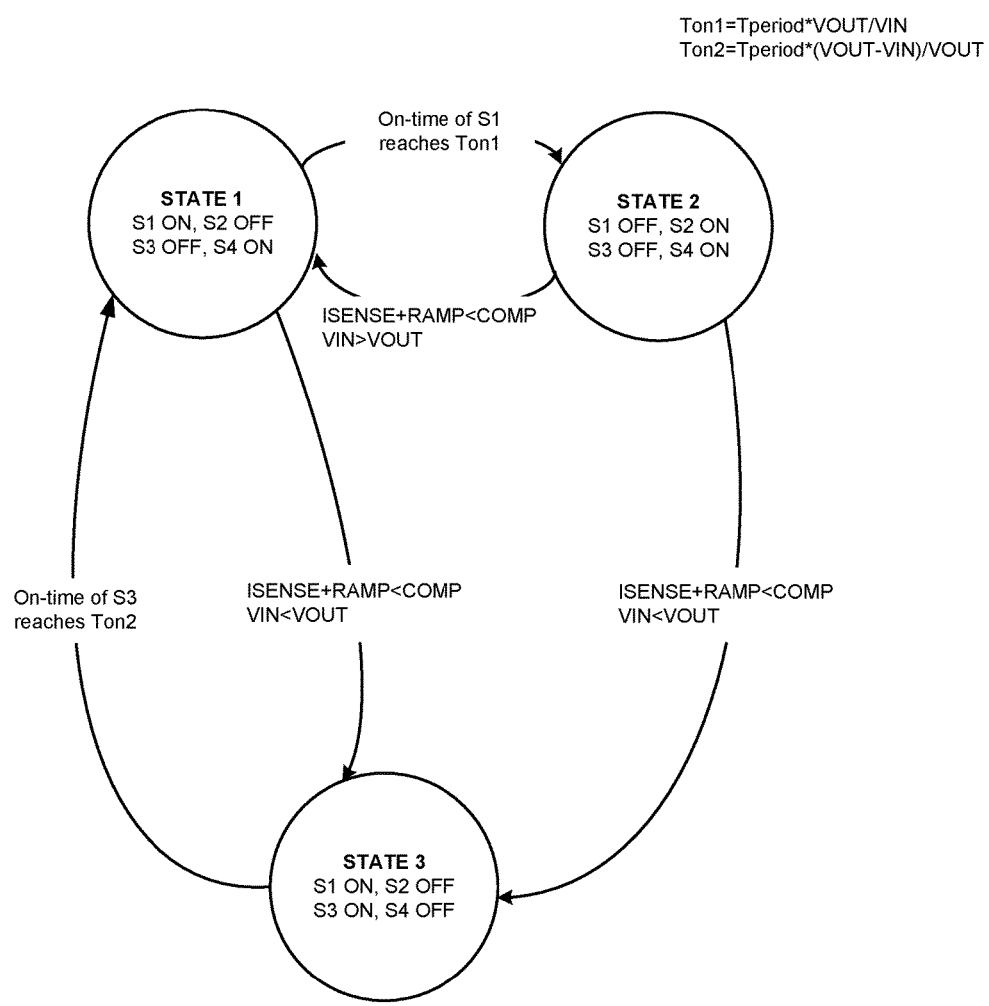
FIG. 4 is a working state diagram of the buck-boost converter 200 in accordance with an embodiment of the present invention.

FIG. 4 is a working state diagram of the buck-boost converter 200 in accordance with an embodiment of the present invention. As can been seen from the diagram, the converter 200 only switches between STATE 1 and 2 in BUCK mode, and only switches between STATE 1 and 3 in BOOST mode. In BUCK-BOOST mode, the converter 200 switches among STATE3, STATE 1 and STATE2 in sequence.

As analyzed above, the constant on-time control adopted in the buck-boost converter 200 makes automatic and smooth mode transition come true. And thanks to the equivalent ramp signal RAMP, the robustness of the system is also improved.

In order to make sure the converter work smoothly while the input voltage VIN approaches the output voltage VOUT, an offset value might be added into the second time threshold Ton2. The second time threshold Ton in this situation could be expressed as:

$$Ton2 = Tperiod * \left( \frac{VOUT - VIN}{VOUT} + OFFSET \right) \quad (4)$$

The offset value OFFSET is determined by practical applications, and could be, for instance, 10%.

An alternative solution could be determining the working modes based on the relationship between the voltage VIN and VOUT. For example, when the input voltage VIN is larger than 125%*VOUT, the set signal SET is disconnected from the first input terminal of the second logic circuit 207 to let the converter work in BUCK mode. When the output voltage VOUT is larger than 120%*VIN, the first on-time control signal COT1 generated by the first on-time control circuit 203 is disabled to let the converter work in BOOST mode. Otherwise, the converter will work in BUCK-BOOST mode.

Figure 5A:
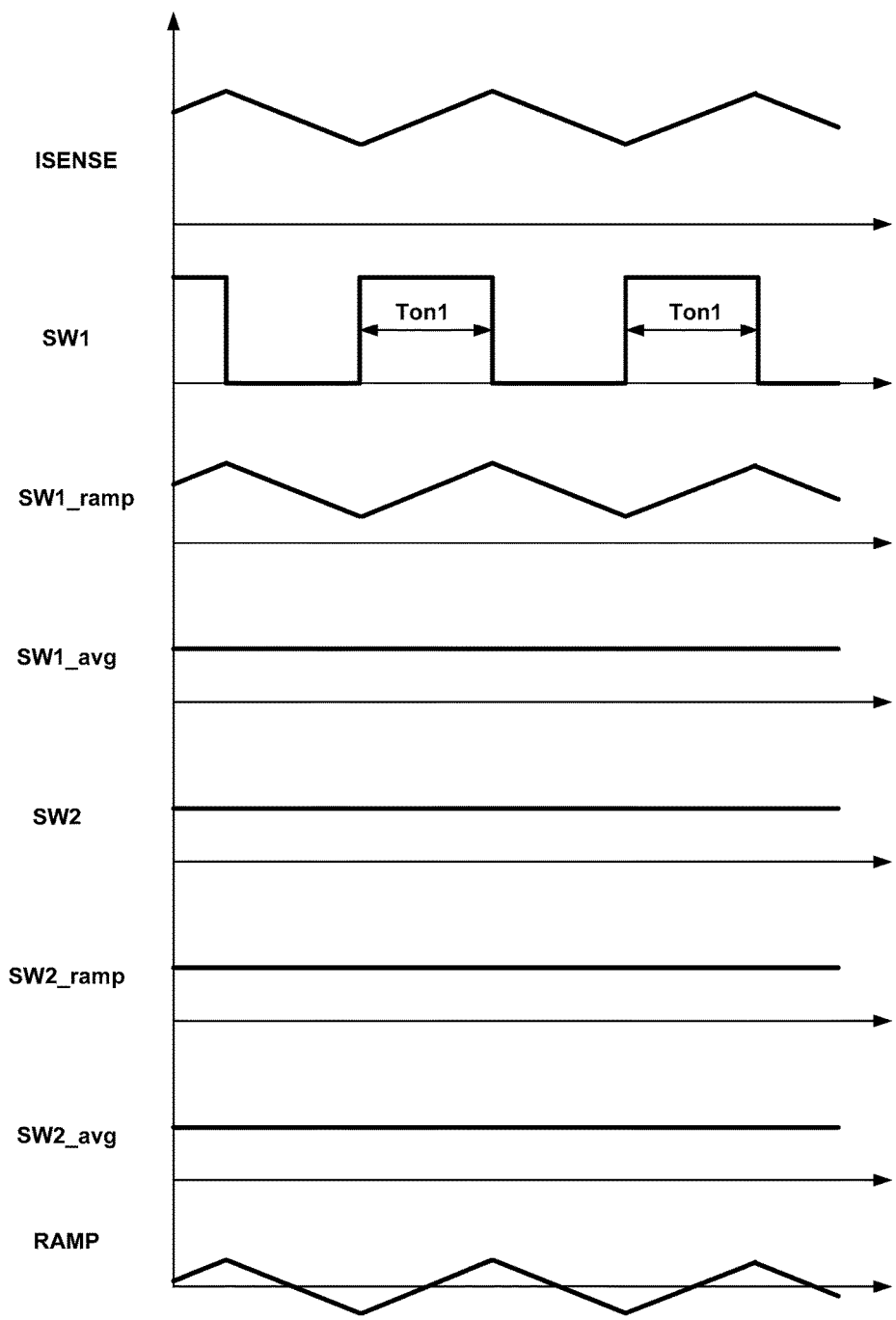
FIG. 5A-5C respectively illustrate working waveforms of the buck-boost converter 200 during different working modes in accordance with an embodiment of the present invention.
Figure 5B:
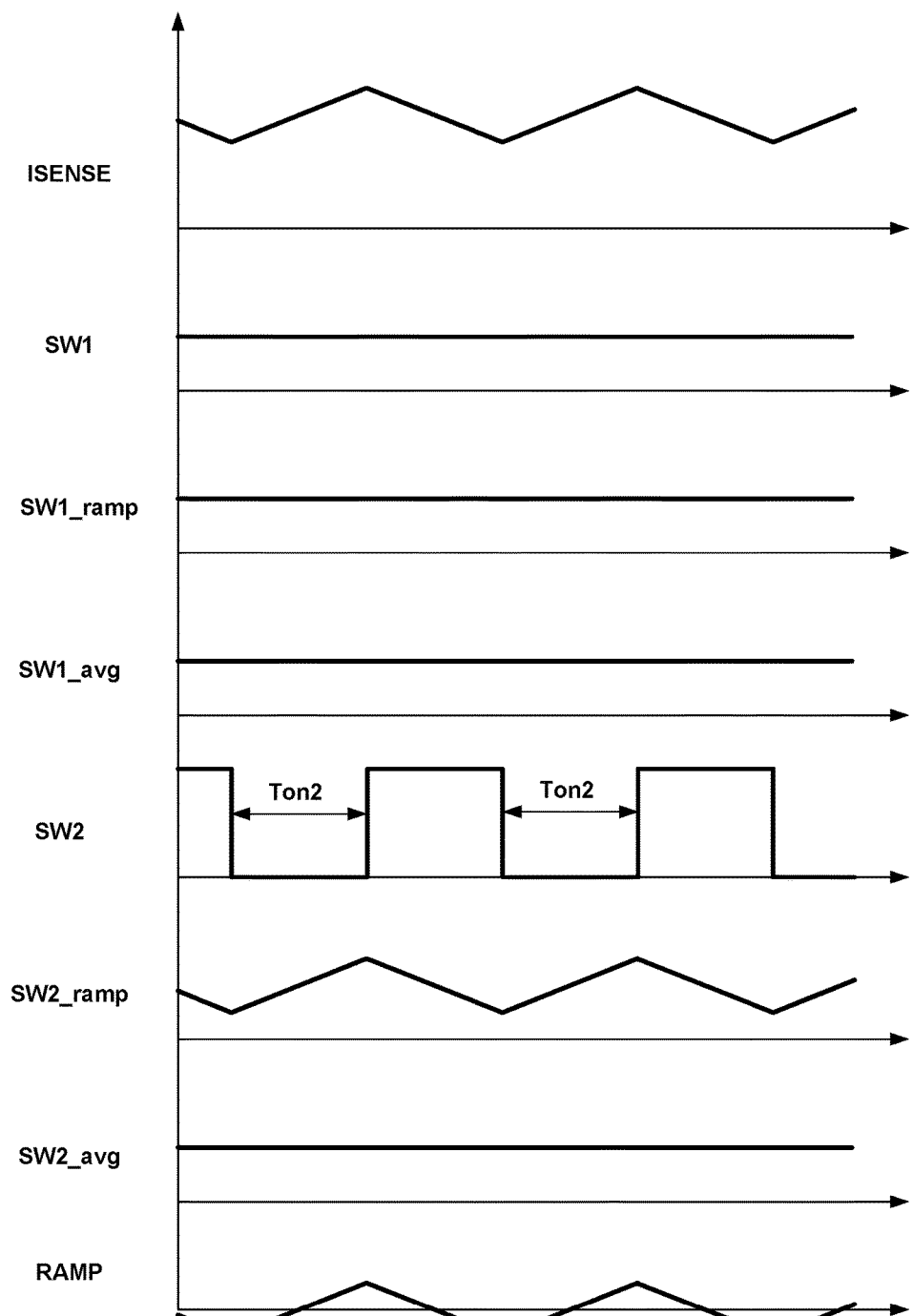
Figure 5C:
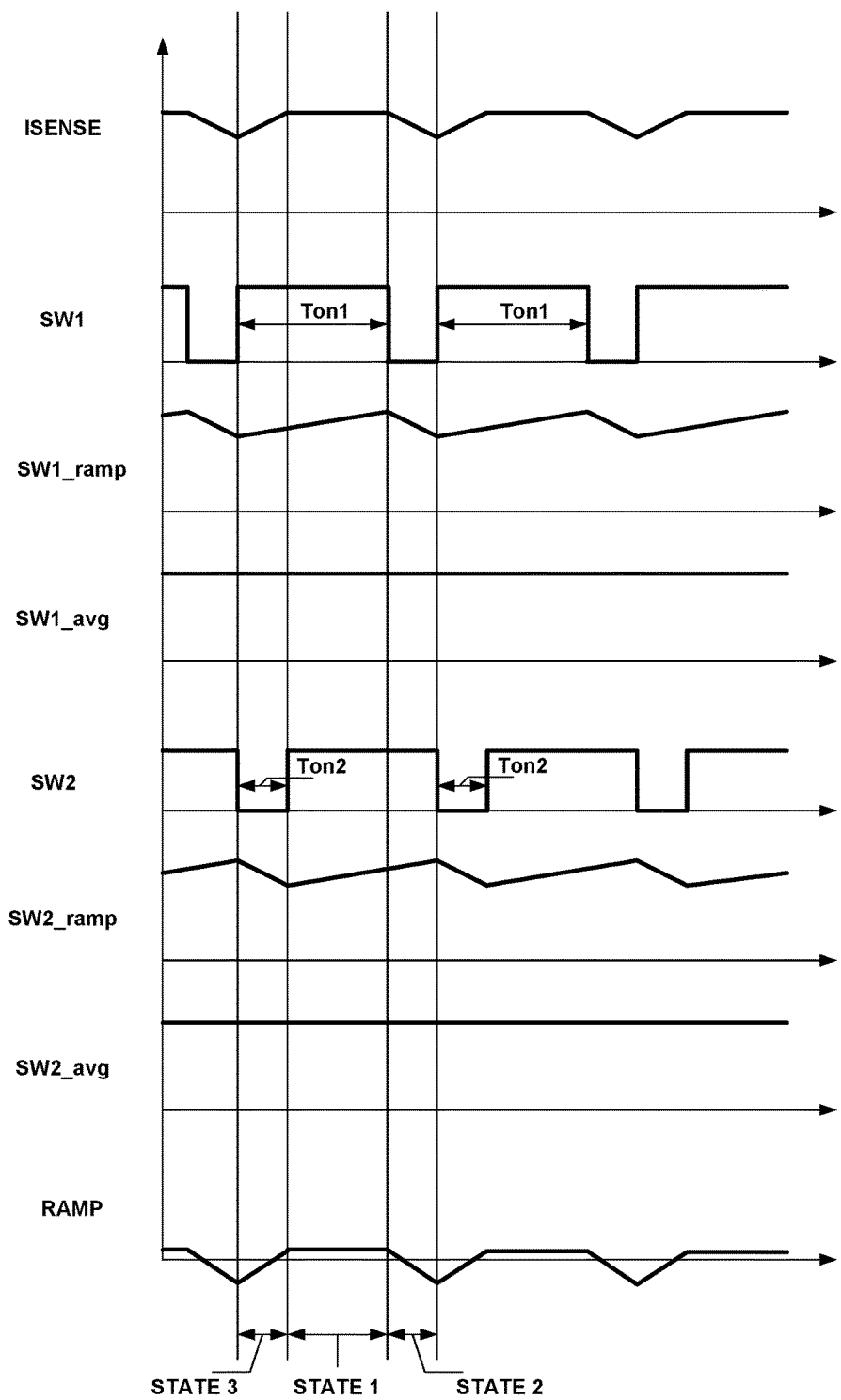

FIG. 5A-5C respectively illustrate working waveforms of the buck-boost converter 200 during different working modes in accordance with an embodiment of the present invention. As shown in FIG. 5A, the transistor S3 maintains off and the transistor S4 maintains on in BUCK mode. The voltage at the second switching node SW2 is substantially equal to the output voltage VOUT, thus the second ramp signal SW2_ramp and the second average signal SW2_avg are equal. The equivalent ramp signal RAMP is determined by the first ramp signal SW1_ramp and the first average signal SW1_avg, and could be expressed as:

$$RAMP = SW1\_ramp - SW1\_avg \quad (5)$$

In BOOST mode, as can be seen from FIG. 5B, the transistor S1 maintains on and the transistor S2 maintains off. The voltage at the first switching node SW1 is substantially equal to the input voltage VIN, thus the first ramp signal SW1_ramp and the first average signal SW1_avg are equal. The equivalent ramp signal RAMP is determined by the second ramp signal SW2_ramp and the second average signal SW2_avg, and could be expressed as:

$$RAMP = SW2\_avg - SW2\_ramp \quad (6)$$

The working waveforms in the BUCK-BOOST mode is shown in FIG. 5C, wherein the equivalent ramp signal RAMP rises in STATE 3, remains approximately constant in STATE 1 and declines in STATE 2. Since the difference between the input voltage VIN and the output voltage VOUT is not that large in BUCK-BOOST mode, the ripple of the current sensing signal ISENSE is relatively small. Thus only in the STATE 2 could the signal (ISENSE+RAMP) decrease to be smaller than the compensation signal COMP, to get the converter to enter into the next switching period.

As can be seen from FIG. 5A-5C, the equivalent ramp signal RAMP perfectly simulates the inductor current and therefore effectively eliminate the sub-harmonic oscillation potentially existing in constant on-time control.

Figure 6:
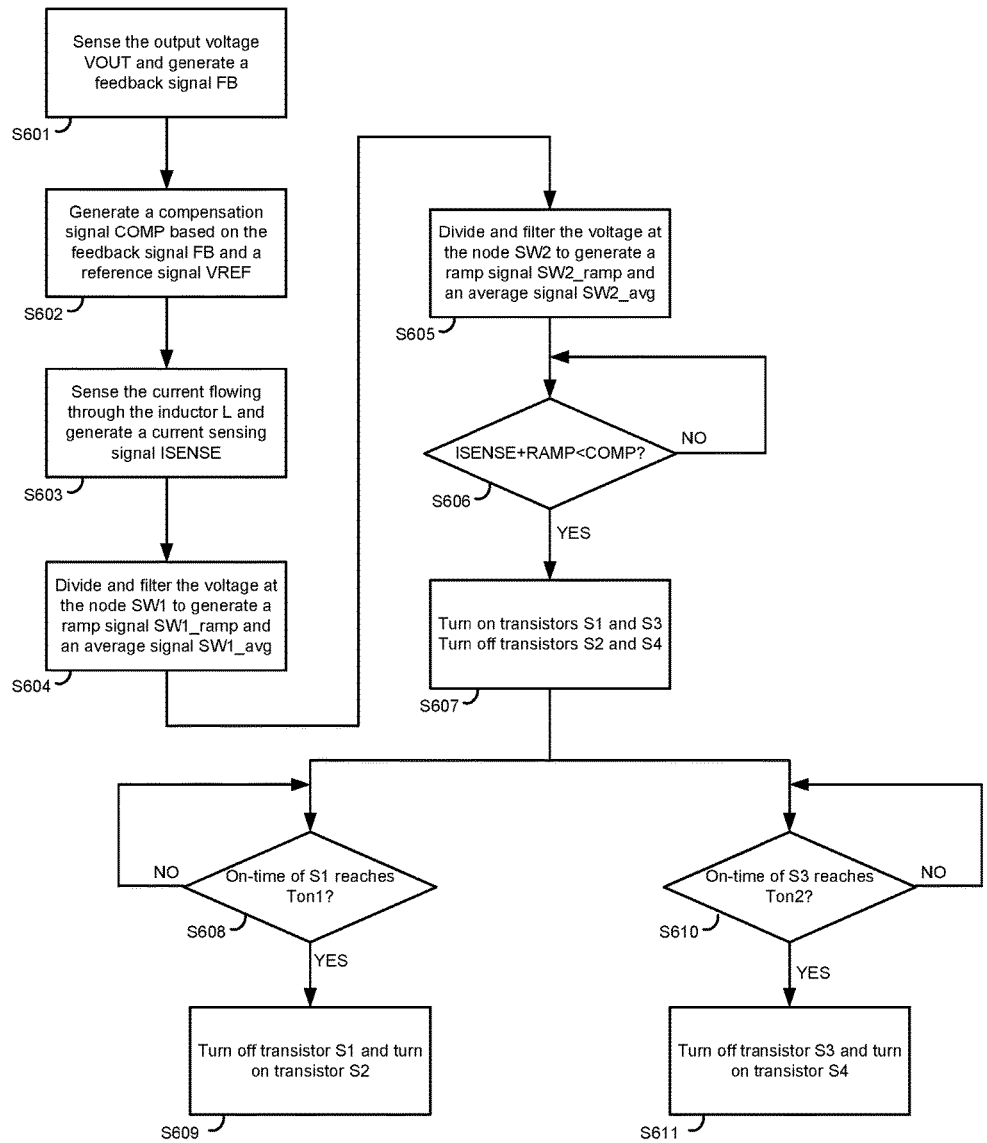
FIG. 6 is a working flowchart of the buck-boost converter 200 in accordance with an embodiment of the present invention.

FIG. 6 is a working flowchart of the buck-boost converter 200 in accordance with an embodiment of the present invention. It comprises steps S601~S611.

At step S601, the output voltage VOUT is sensed to generate a feedback signal FB indicative of it.

At step S602, a compensation signal COMP is generated based on a reference signal VREF and the feedback signal FB.

At step S603, the current flowing through the inductor L is sensed to generate a current sensing signal ISENSE.

At step S604, the voltage at the first switching node SW1 is divided and filtered to generate a first ramp signal SW1_ramp and a first average signal SW1_avg.

At step S605, the voltage at the second switching node SW2 is divided and filtered to generate a second ramp signal SW2_ramp and a second average signal SW2_avg.

At step S606, a sum of the current sensing signal ISENSE and an equivalent ramp signal RAMP (RAMP=SW1_ramp−

SW1_avg+SW2_avg−SW2_ramp) is compared with the compensation signal COMP. If (ISENSE+RAMP) is lower than the compensation signal COMP, the process will go to S607, otherwise, it will keep waiting.

At step S607, the transistors S1 and S3 are turned on, and the transistors S2 and S4 are turned off.

At step S608, whether the on-time of the transistor S1 reaches a first time threshold Ton1 is detected. If the on-time of the transistor S1 reaches the first time threshold Ton1, the process proceeds to step S609.

At step S609, the transistor S1 is turned off and the transistor S2 is turned on.

At step S610, whether the on-time of the transistor S3 reaches a second time threshold Ton2 is detected. If the on-time of the transistor S3 reaches the second time threshold Ton2, the process will proceed to step S611.

At step S611, the transistor S3 is turned off and the transistor S4 is turned on.

Figure 7:
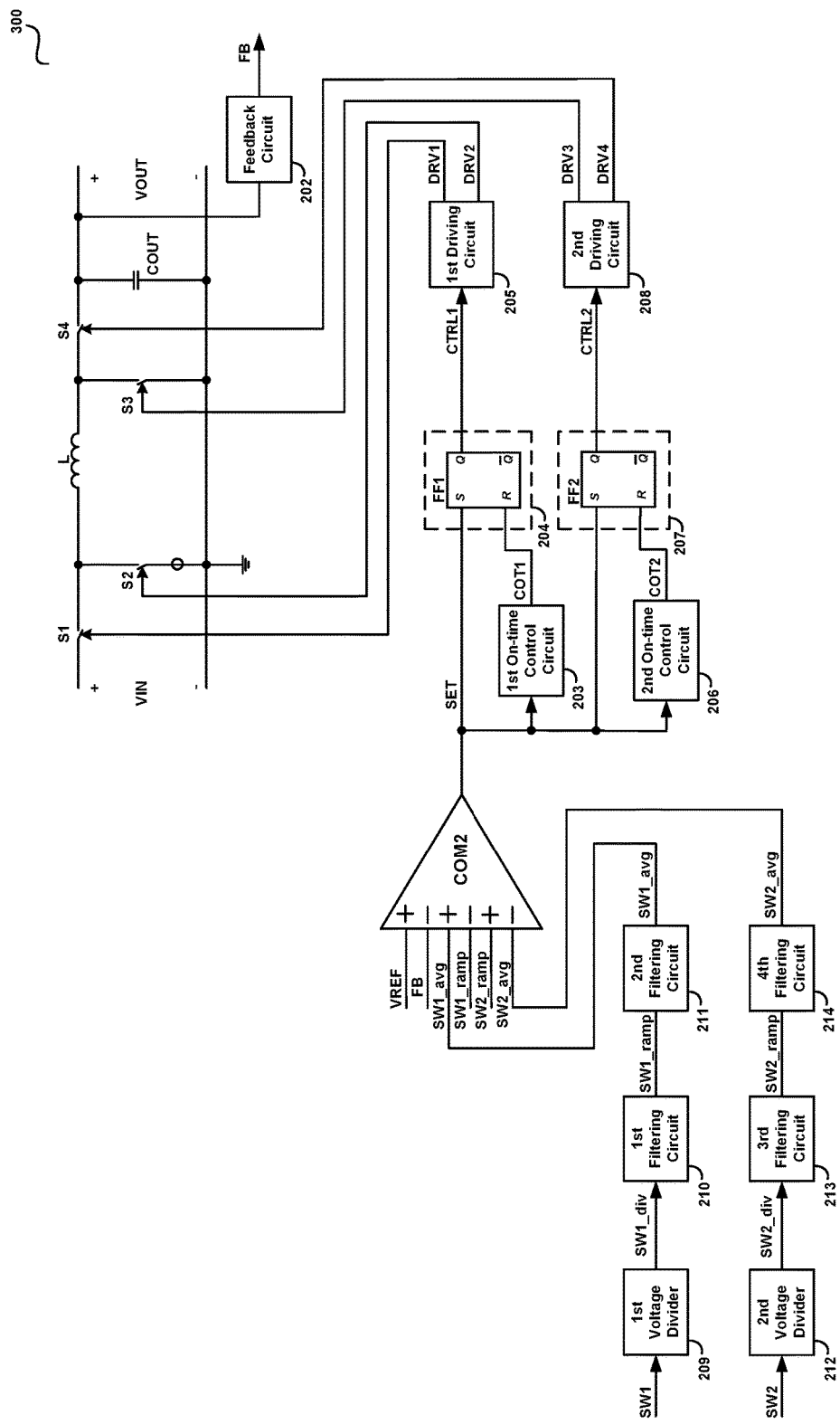
FIG. 7 is a block diagram of a buck-boost converter 300 in accordance with an embodiment of the present invention.

Although the set signal SET is generated based on the current sensing signal ISENSE, the compensation signal COMP and the equivalent ramp signal RAMP in the embodiment of FIG. 2, it should be noted that this is not used to limit the scope of the present invention. As shown in FIG. 7, the set signal SET can also be provided through directly comparing a sum of the feedback signal FB and the equivalent ramp signal RAMP with the reference signal VREF.

Figure 8:
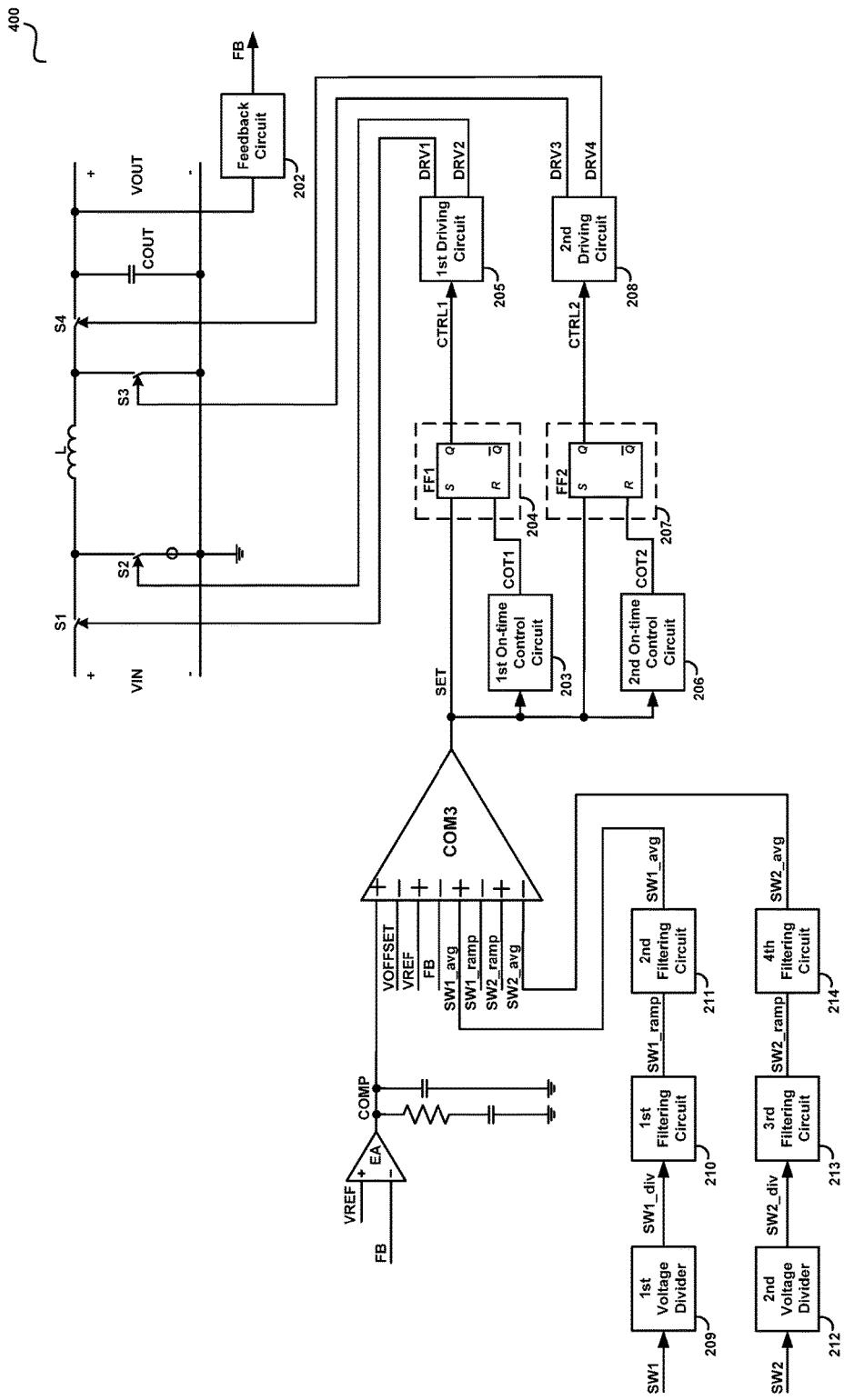
FIG. 8 is a block diagram of a buck-boost converter 400 in accordance with an embodiment of the present invention.

To eliminate the DC error caused by ramp compensation, an error correction loop is further incorporated in the embodiment shown in FIG. 8. Compared with FIG. 7, the comparator COM3 of FIG. 8 has two additional input terminals with one coupled to the error amplifier EA to receive the compensations signal COMP, and another configured to receive an offset signal Voffset. The comparator COM3 compares a sum of the feedback signal FB, the offset signal Voffset, the first ramp signal SW1_ramp and the second average signal SW2_avg with a sum of the reference signal VREF, the compensation signal COMP, the first average signal SW1_avg and the second ramp signal SW2_ramp, so as to generate the set signal SET.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control method of a buck-boost converter, wherein the buck-boost converter having a first transistor coupled between an input voltage and a first switching node, a second transistor coupled between the first switching node and a reference ground, a third transistor coupled between a second switching node and the reference ground, a fourth transistor coupled between the second switching node and an output voltage, and an inductor coupled between the first switching node and the second switching node, the control method comprises:

filtering the voltage at the first switching node and generating a first ramp signal;

filtering the first ramp signal and generating a first average signal;

filtering the voltage at the second switching node and generating a second ramp signal;

filtering the second ramp signal and generating a second average signal;

generating a set signal based on the first ramp signal, the first average signal, the second ramp signal, the second average signal, a reference signal, and a feedback signal indicative of the output voltage, so as to turn on the first and third transistors, and to turn off the second and fourth transistors;

determining whether the on-time of the first transistor reaches a first time threshold, and turning off the first transistor and turning on the second transistor when the first time threshold is reached; and determining whether the on-time of the third transistor reaches a second time threshold, and turning off the third transistor and turning on the fourth transistor when the second time threshold is reached.

2. The control method of claim 1, wherein the first time threshold is proportional to the output voltage and inversely proportional to the input voltage, and wherein the second time threshold is proportional to the difference between the output voltage and the input voltage, and is inversely proportional to the output voltage.

3. The control method of claim 2, wherein an offset value is added into the second time threshold.

4. The control method of claim 1, wherein the step of generating the set signal further comprises:

generating a compensation signal based on the reference signal and the feedback signal;

sensing the current flowing through the inductor and generating a current sensing signal; and comparing a sum of the current sensing signal, the first ramp signal and the second average signal with a sum of the compensation signal, the first average signal and the second ramp signal; wherein the first and third transistors are turned on and the second and fourth transistors are turned off when the sum of the current sensing signal, the first ramp signal and the second average signal becomes smaller than the sum of the compensation signal, the first average signal and the second ramp signal.

5. The control method of claim 1, wherein the step of generating the set signal further comprises:

comparing a sum of the feedback signal, the first ramp signal and the second average signal with a sum of the reference signal, the first average signal and the second ramp signal, so as to generate the set signal; wherein the first and third transistors are turned on and the second and fourth transistors are turned off when the sum of the feedback signal, the first ramp signal and the second average signal is smaller than the sum of the reference signal, the first average signal and the second ramp signal.

6. A controller used in a buck-boost converter, wherein the buck-boost converter having a first transistor coupled between an input voltage and a first switching node, a second transistor coupled between the first switching node and a reference ground, a third transistor coupled between a second switching node and the reference ground, a fourth transistor coupled between the second switching node and an output voltage, and an inductor coupled between the first switching node and the second switching node, the controller comprises:

a first filtering circuit configured to filter the voltage at the first switching node and generate a first ramp signal;

a second filtering circuit configured to filter the first ramp signal and generate a first average signal;

a third filtering circuit configured to filter the voltage at the second switching node and generate a second ramp signal;

a fourth filtering circuit configured to filter the second ramp signal and generate a second average signal;

a comparing circuit coupled to the first, second, third and fourth filtering circuits and configured to generate a set signal based on the first ramp signal, the first average signal, the second ramp signal, the second average signal, a reference signal, and a feedback signal indicative of the output voltage;

a first on-time control circuit coupled to the comparing circuit, wherein based on the set signal, the first on-time control circuit compares the on-time of the first transistor with a first time threshold and generates a first on-time control signal;

a second on-time control circuit coupled to the comparing circuit, wherein based on the set signal, the second on-time control circuit compares the on-time of the third transistor with a second time threshold and generates a second on-time control signal;

a first logic circuit coupled to the comparing circuit and the first on-time control circuit, wherein based on the set signal and the first on-time control signal, the first logic circuit generates a first control signal to control the first and second transistors; and a second logic circuit coupled to the comparing circuit and the second on-time control circuit, wherein based on the set signal and the second on-time control signal, the second logic circuit generates a second control signal to control the third and fourth transistors.

7. The controller of claim 6, wherein the first time threshold is proportional to the output voltage and inversely proportional to the input voltage, and wherein the second time threshold is proportional to the difference between the output voltage and the input voltage, and is inversely proportional to the output voltage.

8. The controller of claim 6, further comprises
an error amplifying circuit having a first input terminal, a second input terminal and a output terminal, wherein the first input terminal is configured to receive the reference signal, the second input terminal is configured to receive the feedback signal, and wherein based on the reference signal and the feedback signal, the error amplifying circuit generates a compensation signal at the output terminal; wherein
the comparing circuit has a first input terminal, a second input terminal, a third input terminal, a fourth input terminal, a fifth input terminal, a sixth input terminal and an output terminal, wherein the first input terminal is coupled to the output terminal of error amplifying circuit, the second input terminal is configured to receive a current sensing signal indicative of the current flowing through the inductor, the third input terminal is configured to receive the first average signal, the fourth input terminal is configured to receive the first ramp signal, the fifth input terminal is configured to receive the second ramp signal, the six input terminal is configured to receive the second average signal, and wherein the comparing circuit compares a sum of the current sensing signal, the first ramp signal and the second average signal with a sum of the compensation signal, the first average signal and the second ramp signal, and generates the set signal at the output terminal.

9. The controller of claim 6, wherein the comparing circuit generates the set signal based on comparing a sum of the feedback signal, the first ramp signal and the second average signal with a sum of the reference signal, the first average signal and the second ramp signal.

10. The controller of claim 6, further comprising:
a first voltage divider coupled between the first switching node and the first filtering circuit; and
a second voltage divider coupled between the second switching node and the third filtering circuit.

11. A buck-boost converter comprising:
a first transistor having a first terminal, a second terminal and a control terminal, wherein the first terminal is configured to receive an input voltage;

a second transistor having a first terminal, a second terminal and a control terminal, wherein the first terminal is coupled to the second terminal of the first transistor to form a first switching node, the second terminal is coupled to a reference ground;

a third transistor having a first terminal, a second terminal and a control terminal, wherein the second terminal is coupled to the reference ground;

a fourth transistor having a first terminal, a second terminal and a control terminal, wherein the first terminal is coupled to the first terminal of the third transistor to form a second switching node, the second terminal is configured to provide an output voltage;

an inductor coupled between the first switching node and the second switching node;

a feedback circuit configured to generate a feedback signal indicative of the output voltage;

a first filtering circuit configured to filter the voltage at the first switching node and generate a first ramp signal;

a second filtering circuit configured to filter the first ramp signal and generate a first average signal;

a third filtering circuit configured to filter the voltage at the second switching node and generate a second ramp signal;

a fourth filtering circuit configured to filter the second ramp signal and generate a second average signal;

a comparing circuit coupled to the first to fourth filtering circuits and configured to generate a set signal based on the first ramp signal, the first average signal, the second ramp signal, the second average signal, a reference signal, and the feedback signal;

a first on-time control circuit coupled to the comparing circuit, wherein based on the set signal, the first on-time control circuit compares the on-time of the first transistor with a first time threshold and generates a first on-time control signal;

a second on-time control circuit coupled to the comparing circuit, wherein based on the set signal, the second on-time control circuit compares the on-time of the third transistor with a second time threshold and generates a second on-time control signal;

a first logic circuit coupled to the comparing circuit and the first on-time control circuit, wherein based on the set signal and the first on-time control signal, the first logic circuit generates a first control signal to control the first and second transistors; and a second logic circuit coupled to the comparing circuit and the second on-time control circuit, wherein based on the set signal and the second on-time control signal, the second logic circuit generates a second control signal to control the third and fourth transistors.

12. The buck-boost converter of claim 11, wherein the first time threshold is proportional to the output voltage and inversely proportional to the input voltage, and wherein the second time threshold is proportional to the difference between the output voltage and the input voltage, and is inversely proportional to the output voltage.

13. The buck-boost converter of claim 11, further comprises:
an error amplifying circuit having a first input terminal, a second input terminal and an output terminal, wherein the first input terminal is configured to receive the reference signal, the second input terminal is configured to receive the feedback signal, and wherein based on the reference signal and the feedback signal, the error amplifying circuit generates a compensation signal at the output terminal; wherein
the comparing circuit has a first input terminal, a second input terminal, a third input terminal, a fourth input terminal, a fifth input terminal, a sixth input terminal and an output terminal, wherein the first input terminal is coupled to the output terminal of error amplifying circuit, the second input terminal is configured to receive a current sensing signal indicative of the current flowing through the inductor, the third input terminal is configured to receive the first average signal, the fourth input terminal is configured to receive the first ramp signal, the fifth input terminal is configured to receive the second ramp signal, the six input terminal is configured to receive the second average signal, and wherein the comparing circuit compares a sum of the current sensing signal, the first ramp signal and the second average signal with a sum of the compensation signal, the first average signal and the second ramp signal, and generates the set signal at the output terminal.

14. The buck-boost converter of claim 11, wherein the comparing circuit compares a sum of the feedback signal, the first ramp signal and the second average signal with a sum of the reference signal, the first average signal and the second ramp signal, so as to generate the set signal.

15. The buck-boost converter of claim 11, further comprising:
a first voltage divider coupled between the first switching node and the first filtering circuit; and
a second voltage divider coupled between the second switching node and the third filtering circuit.

* * * * *